Patented May 15, 1923.

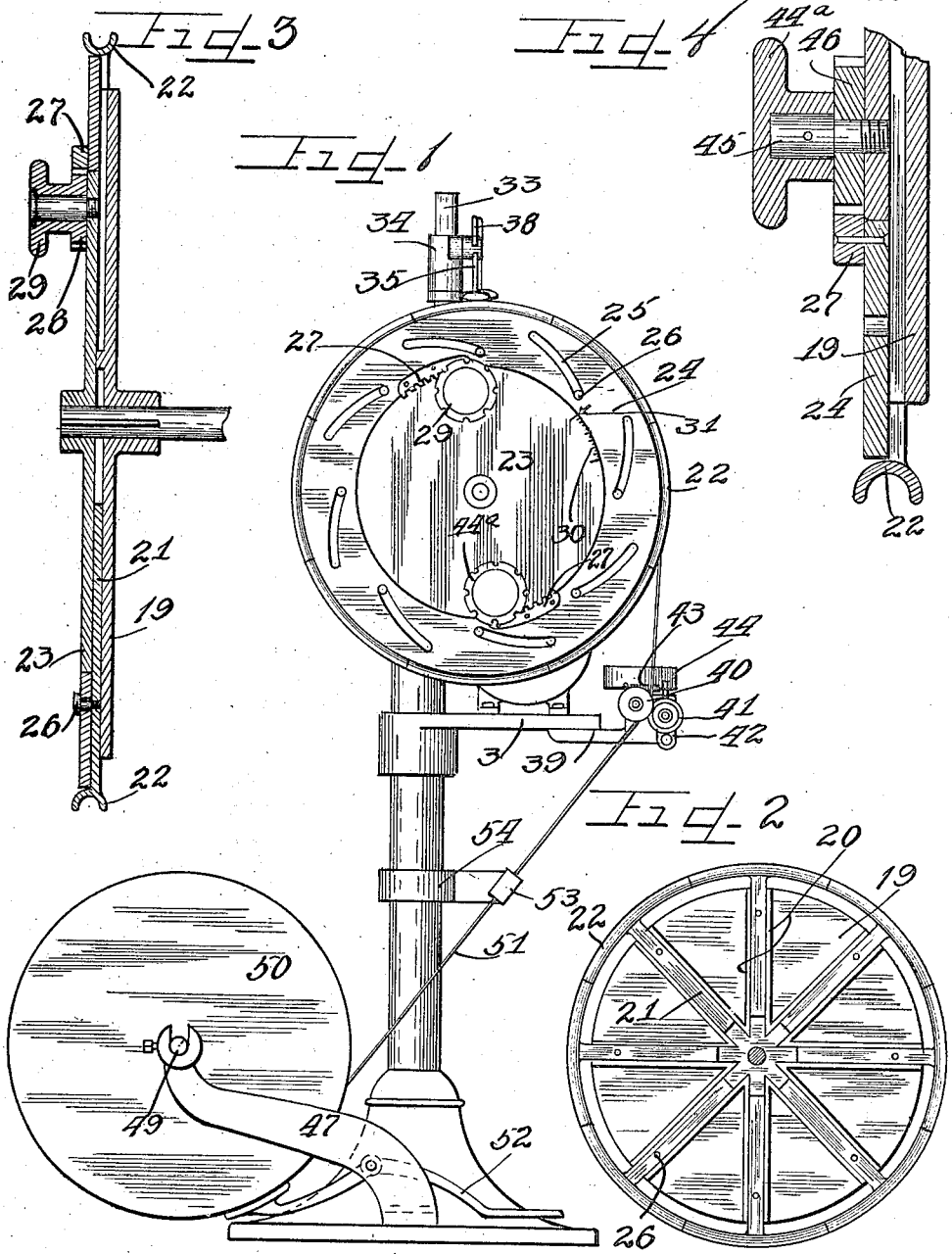

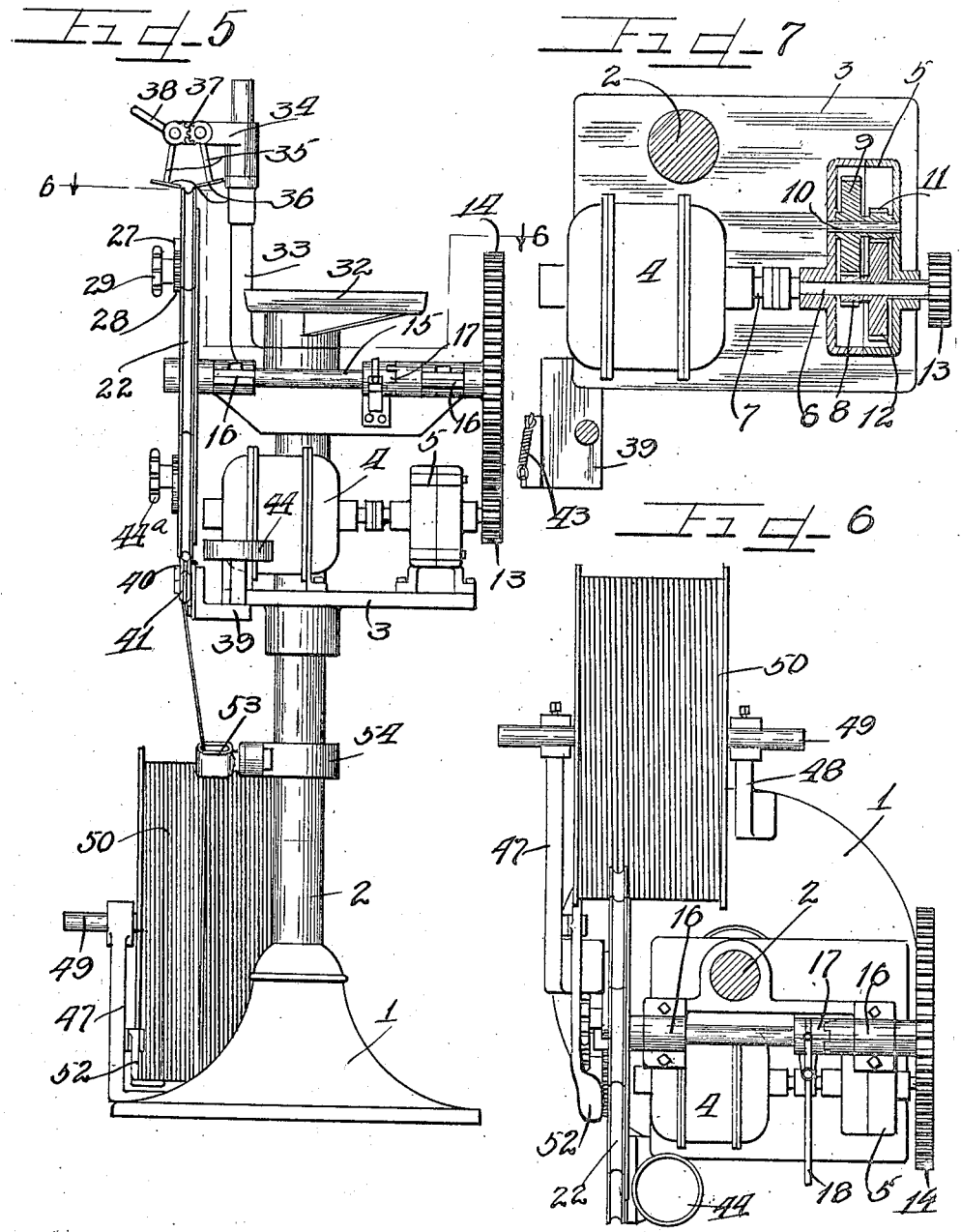

1,455,207

UNITED STATES PATENT OFFICE.

RALPH W. HUTCHENS AND SAMSON H. SMITH, OF EAU CLAIRE, WISCONSIN, ASSIGNORS TO GILLETTE RUBBER CO., A CORPORATION OF MAINE.

BEAD-FORMING MACHINE.

Application filed September 8, 1919. Serial No. 322,510.

*To all whom it may concern:*

Be it known that we, RALPH W. HUTCHENS and SAMSON H. SMITH, citizens of the United States, and residents of the city of Eau Claire, in the county of Eau Claire and State of Wisconsin, have invented certain new and useful Improvements in a Bead-Forming Machine; and we do hereby declare that the following is a full, clear, and exact description of the same, reference being had to the accompanying drawings, and to the numerals of reference marked thereon, which form a part of this specification.

This invention relates to that class of devices known as forming machines, and is adapted to form a reinforcement bead, in the present instance of metal, for application into a tire, there being two of such beads, as well known, provided on each side of a tire formed.

This invention comprehends the use of a machine into which a reel of the reinforcement material for the bead is mounted and from which it is led through a suitable shaping means to an expansible wheel, the wheel being expanded to a diameter corresponding to that of the tire in which the bead is to be used, and the bead being given the proper form before being led into the wheel and there receiving the retaining means applied thereto.

It is an object of this invention to provide a bead-forming machine which is power driven and provided with means for disconnecting the drive when desired and comprising an expansible wheel on which the reinforcing material constituting the bead to be formed is led, the wheel being expansible and contractible to a diameter corresponding to that of a tire to be formed in which the bead is to be used as a reinforcement.

It is also an object of this invention to provide a bead forming machine having an expansible bead forming wheel with means for expanding the same to increase the diameter or degree of expansion thereof.

It is finally an object of this invention to construct a forming mechanism comprising a power driving means for a forming mechanism on which the power can be disconnected as desired and with the various parts of the forming machine handling the material of which the bead is made adjustable for different purposes to suit the requirements and use of the bead formed for use as a reinforcement in a tire.

Other and further important objects of this invention will be apparent from the disclosures in the drawings and specification.

The invention (in a preferred form) is illustrated in the drawings and hereinafter more fully described.

*Drawings.*

Figure 1 is a side elevation of a power driven bead forming machine.

Figure 2 is an interior view of the expansible wheel of the device and with its shaft shown in section.

Figure 3 is a vertical section taken through the expansible wheel at right angles to the plane of the wheel with parts omitted and parts shown in elevation.

Figure 4 is an enlarged detail fragmentary section illustrating the clamping knob and co-acting mechanisms on the face of the expansible wheel.

Figure 5 is an end elevation of the machine.

Figure 6 is a plan view thereof with parts shown in section taken on line 6—6 of Figure 5.

Figure 7 is a detail plan view of the table on which the power mechanism is mounted, with parts shown in section.

*Description.*

Referring both to Figures 1 and 5 the reference numeral 1 denotes a base having an upright or standard 2 and secured on said upright standard is a table 3. The table 3 has mounted thereon an electric driving motor 4 which is directly coupled to a reduction gear denoted as a whole by the reference numeral 5 and which as shown in detail in Figure 7 consists of a shaft 6 driven by motor shaft 7 to which it is coupled, and having secured thereon within the casing, a pinion 8. The pinion 8 meshes with a gear 9, mounted on a shaft 10 and integral with said gear 9 is a pinion 11 which in turn meshes with a gear 12 journaled upon shaft 6 and said gear 12 is provided with a hub or sleeve shaft extension projecting outwardly through the casing and having secured or integrally formed thereon a pinion 13. Said pinion 13 meshes with and serves to drive a large gear 14 which is secured upon one member of a two part or sectional shaft 15, journaled in bearings 16 on a bracket attached upon the upright 2 and provided with a clutch 17 by which the two parts of the shaft 15 are brought into driving relation. Said clutch is operable by a pivoted lever 18.

Secured upon one section of the shaft 15 is the expansible wheel of the bead forming machine. This wheel consists of a back plate 19 formed with radial ribs 20 having slidably mounted therebetween integral bar members 21 of peripheral grooved elements of arc shape denoted by the reference numerals 22, all of which abut one another as shown in Figure 2 when retracted to form a complete circular grooved periphery for the wheel. Secured also upon said section of the shaft 15, is a plate 23 and rotatably mounted around the periphery thereof is an annulus or ring plate 24 provided with a plurality of curved slots 25, each engaged by a pin 26, which is secured to one of the slide bar extensions 21 so that a rotational adjustment of the annulus 24, will serve to expand or retract the grooved elements 21—22 relative the axis of the wheel 3. For the purpose of adjusting the annulus 24 with reference to plate 23, a pair of curved rack bars 27 are set diametrically opposite to one another at the inner periphery of the front surface of annulus 24, and pivotally mounted upon the plate 23, is a pinion 28 for a co-action with one of said rack bars having an integral hand knob 29 formed thereon. A graduated scale 30 is provided upon the periphery of the annulus 24 as shown in Figure 1 indicating the adjustment of the annulus and as a consequence, the diameter of the assembled grooved elements 22 whatever their adjustment. Also mounted upon the upright 2 as shown in Figure 5 is a table 32 and an upwardly extending bracket 33 is also secured upon said upright 2 beneath table 32, but extends thereabove, and is provided with an adjustable arm 34. Pivotally mounted on the arm 34 are a pair of arms 35 one ahead of the other and each having roller discs 36, journalled on the lower ends thereof. Said arms at their upper ends are formed to afford inter-meshing gear segments 37 whereby the adjustment of the handle 38 on one of said pivoted arms serves to adjust the other thereof simultaneously so that the rollers may be adjusted toward or away from one another.

Below and to one side of the expansible grooved wheel as shown clearly in Figures 1 and 5, is a shelf 39 attached beneath the table 3. Extending upwardly therefrom and journalled in a bracket extension of said shelf, are a grooved roller 40 and a convex co-acting roller 41. The convex roller 41 is mounted in a pivoted arm 42, and is held toward the grooved roller 40 by a spring 43, connected to said arm 42 and to a stationary projection on shelf. Also mounted on shelf extension 39 is a circular table 44.

A clamping device is provided for the adjustable annulus 24 comprising a knob 44ᵃ mounted on a screw shaft 45 with a pinion 46 journaled thereon and when the knob is tightened up the shaft travels inwardly to clamp the pinion and lock the expansible member from adjustment.

A pair of arms 47 and 48, respectively as shown in Figures 1 and 6, are provided, attached upon the base 1, as shown clearly in Figures 1 and 6 to receive the ends of the shaft 49 of a reel 50 having a braided wire 51 wound thereon. A foot lever 52 is pivoted upon the arm 47, and has a bearing portion for contact with the reel 50 to operate as a brake therefor. The braided wire 51 is led outwardly from the reel 50 through an eye 53. This eye is adjustably mounted in a collar 54 which is in turn adjustable upon the standard 2.

Operation.

A reel of the reinforcement material for the bead such as braided wire is placed in the bracket arms 47—48 of the machine, and one end thereof led through the outlet through the guiding eye 53 upwardly between the co-acting, grooved and convex rollers respectively and attached into the groove of the expansible wheel which has been adjusted to the diameter of the bead which it is desired to form, for a particular tire. The power is applied to the motor 4, and the clutch 17 is engaged by the lever 18, causing a rotation of the expansible wheel with the bead wire 51 thereon. As said wire passes between the co-acting shaping rolls 40 and 41, it is led into the groove 22 of the expansible wheel and from time to time strips of tape or other retaining means are introduced beneath the wire on the wheel, and are carried around thereby between the co-acting rollers 36, which serve to lap the ends of the strips over, first one end and then the other is lapped over, owing to the stepped or staggered relation of the rolls 36.

We are aware that numerous details of construction may be varied through a wide range without departing from the principles of this invention, and we therefore do not purpose limiting the patent granted otherwise than necessitated by the prior art.

Claims.

1. A bead forming machine of the class described comprising a power drive, an expansible wheel driven thereby, means supplying wire to said wheel, coacting forming rolls leading wire to said wheel, one of said rolls having a concave edge and the other a convex one, the edges being adapted to compress a ribbon of braided wire between them, and means varying the diameter of the wheel according to the diameter of the bead to be formed.

2. In a machine for forming beads for tires, a wheel having a concave rim, means for varying the radius of said wheel, a pair of rollers, adjustable means for supporting said rollers adjacent the rim of said wheel, and manually operable means for causing said rollers to approach each other beyond the edge of said rim.

3. In a machine for forming beads for tires, a wheel having a concave rim, a pair of rollers, means for supporting said rollers adjacent the rim of said wheel, and means for causing said rollers to approach each other beyond the edge of said rim.

4. In combination, a wheel having a concave rim, a pair of shafts mounted near the rim of said wheel, a hub on each shaft intermeshing gears on said hubs, manual means for rotating one of said hubs on its shaft, arms extending one from each of said hubs respectively toward the rim of said wheel, and rollers carried on the end of said arms close to said rim whereby operation of said manual means will move said rollers across the face of said rim.

In testimony whereof, we have hereunto subscribed our names in the presence of two subscribing witnesses.

RALPH W. HUTCHENS.
SAMSON H. SMITH.

Witnesses:
O. H. Hopson,
B. V. Joern.